G. STAUNTON.
PROCESS FOR TREATING RUBBER.
APPLICATION FILED JULY 29, 1912.
1,115,031.
Patented Oct. 27, 1914.
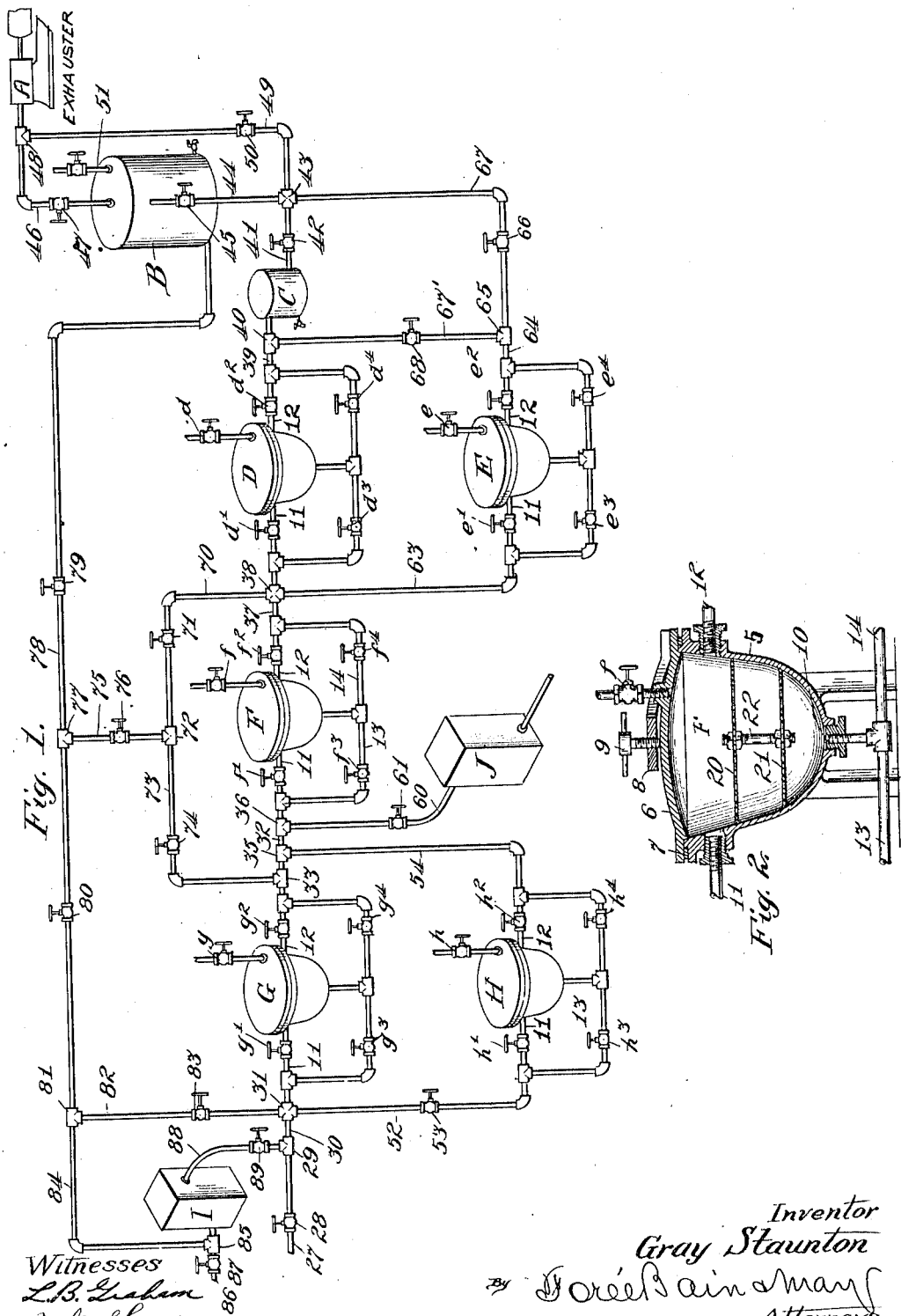
Witnesses
L. B. Graham
Milton Lenoir
Inventor
Gray Staunton
By Foree Bain & May
Attorneys.

UNITED STATES PATENT OFFICE.

GRAY STAUNTON, OF MUSKEGON, MICHIGAN.

PROCESS FOR TREATING RUBBER.

1,115,031.

Specification of Letters Patent.

Patented Oct. 27, 1914.

Application filed July 29, 1912. Serial No. 711,994.

*To all whom it may concern:*

Be it known that I, GRAY STAUNTON, a citizen of the United States, residing at Muskegon, in the county of Muskegon and State of Michigan, have invented certain new and useful Improvements in Processes for Treating Rubber, of which the following is a specification.

My invention relates to a process for treating rubber, and more particularly to the method or process of treating rubber to raise its grade and to de-resinize the rubber gum.

"Low grade" rubber—that is rubber gum of such derivation, or so imperfectly cured, that it is soft and unduly sticky—is practically unmanageable in its original form, but it may be made commercially available by raising its grade by an appropriate degree of vulcanization. Such low grade rubbers—such as Accra flake—have heretofore been treated to raise the grade thereof, by vulcanization with a suitable solution of chlorid of sulfer in bi-chlorid of carbon, said solution being mechanically mixed, as by stirring, with a plastic mass of the gum, previously made to a rather stiff solution with a volatile solvent such as naphtha. Great difficulty has been experienced in the practice of such old processes, however, as it is inherently difficult so properly and uniformly to distribute the vulcanizing agent throughout a gum as to get a uniform product. Also it is almost impossible so to control the action of the vulcanizing agent as to prevent over vulcanization of the mass in whole or in part, the activity of the vulcanizing agent, if a little overdone, rendering the gum, or portions thereof, brittle and substantially worthless. Likewise where the gum contains resin the characteristic stickiness and relative impermeability of the gum makes the uniform treatments of the mass with a resin solvent, such as caustic soda, a matter of considerable difficulty and of uncertainty in results.

My invention has for one of its salient objects to provide a method of treatment overcoming these difficulties and facilitating the de-resination of the rubber, in a fashion which insures uniform and thorough treatment of all portions of the rubber mass, efficacious control of the duration in each step of the process and economical and efficient operation throughout.

Other and further objects of my invention will become apparent to those skilled in the art from the following description.

In the drawings, wherein I have shown an apparatus available for the practice of my invention, Figure 1 is a schematic view showing a desirable lay-out of appliances; Fig. 2 is a sectional view of one of the receptacles.

In the drawing A indicates an exhauster; B a receiving tank, or reservoir; C a surface condenser; D and E receptacles which I will term receivers; F a materials receptacle for the rubber; G, and H receptacles which I will term supply receptacles, and I and J represent heaters.

The exhauster may be of any suitable form of power driven vacuum pump, and the reservoir B may be any suitable hollow receptacle of adequate size, while any practical form of condenser, preferably a surface condenser, may be employed at C. Each of the receptacles D and H is preferably constructed as shown in Fig. 2, comprising a kettle-like body 5, equipped with a cover 6, suitably packed as at 7, for air-tight sealing, and positioned by a retaining strap 8, carrying a tension screw 9 for pressing the cover upon its packing. Each receptacle preferably has a valved air inlet in its top, indicated by a small letter corresponding with the capital reference letter of the receptacle, and each receptacle preferably has further lateral pipes 11 and 12 opening to the "front" and "back" thereof near the top; and a bottom opening 10, connected by a T-joint to two pipes 13 and 14 which are connected back to the pipes 11 and 12 respectively, thereby to form a by-pass with a bottom communication with the receptacle. Each of said pipes 11 and 14 preferably has a controlling valve indicated by a small character corresponding with the reference letter of the receptacle with the exponent 1, 2, 3, or 4, as the case may be, as shown specifically in Fig. 1.

The materials container F is suitably equipped for the retention therein of the material to be treated, and to this end I have shown strainers 20 and 21 located in the body of the receptacle connected by a bolt 22, the strainers leaving clearance spaces for the free circulation of the fluid treating medium above and below the material. For treatment of different specific materials different forms of retaining means may, however, be employed.

In the construction shown valved piping connections through receptacles G, F, and D, condenser C and tank B to the exhauster A are provided by pipe 27, having valve 28, connected through a T 29, pipe 30 and cross-joint 31 to the front pipe 11 of receptacle G, from rear pipe 12, by pipe 32 having T's 33, 35, and 36 to the receptacle F; thence by pipe 37 having cross connection 38 to receptacle D, thence by pipe 39 having T 40 to condenser C, thence by pipe 41 having valve 42 to cross coupling 43, having one leg connected by pipe 44, having valve 45, to the top portion of the tank B, which has an exhaust connection 46 from its top through valve 47 and T 48 to the exhaust pump A. The coupling 43 has another connection 49 through valve 50 to the T 48 in exhaust connection 46 beyond valve 47 and the tank B has a valved air inlet 51.

The supply receptacle H is arranged to be connected in the exhaust system last described in lieu of the receptacle G. The front pipe 11 of receptacle G has connection 52 through valve 53 with cross coupling 31, and the rear pipe 12 of said receptacle has connection 54 with the T 35 of pipe 32. Heater J has piping connections 60 through valve 61 to the T 36. Receptacle E is arranged for connection in the exhaust system in lieu of or in parallel with receptacle D. Pipe 63 extends from cross coupling 38 to the front pipe 11 of receptacle E, the rear pipe 12 of which has connection 64 through T 65 and valve 66 by pipe 67 to the remaining opening of cross coupling 43, the T 65 having connection by pipe 67', having valve 68, to the T 40 of pipe 39. Thus, material from pipe 35 may be drawn through either or both of the receptacles D and E, and the material passing through either receptacle D or E may be passed through or around the condenser C. Cross-coupling 38 has a connection 70 having valve 71 with the T 72 to which T 33 is also connected by pipe 73 having valve 74. The T 72 has its remaining connection by pipe 75 having valve 76 to a T 77 in a return pipe or general by-pass 78, which extends in one direction through valve 79 to the bottom of the reservoir or tank B, and in the other direction through valve 80 to T 81, one leg of which has piping connection 82 having valve 83, to the T 31 while the other leg has connection 84 to a T 85 in the inlet pipe 86 of a heater which has controlling its air opening a valve 87. The heater outlet pipe 88 has valve 89 and communicates with the T 29 in pipe 30. The by-pass 70—73 gives a connection between the supply and receiving receptacles around the materials receptacle, and the return connection 78, through its branches to said by-pass and to the pipe 31 and the heater I gives the capability of connection of any individual one of the receptacles, or combinations thereof, reversely, to the exhauster.

It will be observed that in any of the receptacles flow of air or material may be caused to pass upwardly or downwardly therethrough in either direction, front or rear, by manipulation of the valves 1, 2, 3, and 4, appurtenant to the receptacle, accordingly as the valve 51, 45, 47 and 50 are adjusted to throw the exhauster ahead or behind the receptacle. Also, any receptacle may be used as the starting point of flow of fluid, by the opening of its air valve and the closing of all valves in a direction away from the point of rarefaction. It will be observed that in the systematic arrangement any receptacle may be caused to deliver its fluid contents into any other receptacle of the system by the effect of the single suction device, and that heat may be applied to the material in transit through either of the supply receptacles, or directly through the materials receptacle F by proper use of the heaters I and J.

The apparatus shown may be much simplified and yet be susceptible for use in the practice of the invention, but for convenience and economy and interconnection of devices as herein described is advantageous.

In the treatment of rubber of low grades, and containing resin, the rubber gum is preliminarily made into a stiff solution with naphtha, or other light solvent material. This is often done, in commerce, before the gum is shipped to the consumer, so that this step of the process is generally practised independently of the rest of the process. The gum solution is placed in the receptacle F, between the fine strainers and submitted for a few moments to the effect of an attenuated atmosphere. To this end (all valves not mentioned being always assumed to be closed) valves 50, 42, $d^4$, $d^3$ and $f^2$ are opened, putting the exhauster into communication with receptacle F. When the plastic solution of gum is thus subjected to a vacuum the expansion of the volatile solvent material therein seeking escape, creates within the body a multitude of thin-walled cells and passages and changes the state of the mass to a spongy consistency, readily permeable to fluids and affording a multitude of cell-surfaces to be acted on. To assist in this transformation of the condition of the gum-solution from compactness to sponginess, valves 61 and $f^3$ together may be opened and closed any number of times thereby to subject the material to successive action of hot air and the highly rarefied atmosphere. The resultant spongy mass is then subjected to further treatment for de-resination or change of grade.

Where the rubber gum contains resin de-resination is effected by treating with a resin solvent the rubber gum while in the cellular or spongy plastic condition resulting from the vacuum-treatment, or successive vacuum and heat treatment described. To this end the tank G is supplied with a solution of caustic soda, or other resin solvent, and the tank H is supplied with water, or other suitable washing fluid for the removal of the solvent. Then by opening valves $g, g^4, f^3, f^2, d^3, d^2$, and the valves leading either through or around the condenser C and through or around the tank B, to the pump, caustic soda is caused to flow through and thoroughly infiltrate the spongy mass, the receiver affording a reservoir for the liquid which passes through receptacle D. By opening valves $d, d^3$ 71, 74, $g^4, g^1$, 80 79 and 47 the solution may be made to flow back from the receiving tank around the materials receptacle F to the supply tank G, or by opening valves $f^4 f^1$, in lieu of 71 and 74, may be switched back through the rubber mass and the treatment kept up with a relatively small supply of liquid as long as is deemed desirable. In like manner the water from the receptacle H may be caused to pass (as through path defined by valves $h, h^4, f^3, f^2, e^3, e^2$ 66, 45, 47) from the water tank through the cellular rubber body to the receiving tank E under the influence of suction, and the path may be reversed by connecting the "front end" of the tank H with the general by-pass or return pipe 78, in a manner which will be obvious from the preceding description. Thus the mass is throughly washed, and the moisture may be driven off from the rubber by application of hot air from the heater J.

For partial vulcanization of the rubber to raise its grade (either without or following de-resination) the supply receptacle G is filled with a solution of chlorid of sulfur in bi-sulfid of carbon, or other vulcanizing agent, and the receptacles H and D are supplied with a weak solution of ammonia or other neutralizing agent for the vulcanizing agent. Now by valve operations, as heretofore described, the rubber mass is subjected to an attentuated atmosphere, and then the fumes of the sulfur solution or vulcanizing agent are admitted under control by valve $f^3$ as a throttle, through path defined by valves 28, $g^3, g^2$, so that the vulcanizing agent thoroughly infiltrates the spongy mass of rubber, under the influence of a vacuum tendency, which causes it to penetrate the entire cellular structure rapidly and uniformly. The sulfurous fumes drawn through the material in tank F will be passed through an ammonia solution in tank D, neutralizing the effect of the sulfur and rendering the fumes harmless to the pump and other apparatus beyond said receiver D. Both as to quantity and time of treatment the flow of the vulcanizing agent may be controlled by the valves of the system, and as soon as the vulcanization is sufficiently advanced the supply of vulcanizing agent may be cut off and the ammonia solution may be drawn through the cellular mass from the supply receptacle H. The treatment with the ammonia may be effected either by the introduction of the ammonia solution in liquid form or hot ammonia gases, derived by drawing air through the heater I and over the top of the ammonia by the path defined by valves 87, 89, 52, $h^1, h^2$, may be passed back through the rubber, and where the ammonia liquid is used it may be passed back and forth from receptacle H to receptacle E and vice versa, in the manner heretofore described. When the fluid treatment is finished hot air is drawn through the rubber mas to dry it.

By the practice of the process above described, the low grade rubber gum, preliminarily treated with a solvent to reduce it to a plastic consistency, has its state modified by the expansion under suction, or heat and suction, of the volatile solvent to enlarge the mass and render it cellular and spongy, thereby to expose large thin surfaces throughout its body to subsequent treatment, and then the vapors or liquids are caused to act thereon in proper succession and under constant control.

While I have herein described in some detail a particular means of practice of my invention it will be apparent to those skilled in the art that the apparatus might be greatly simplified and the process carried on by diverse forms of apparatus without departure from my invention and within the scope of the appended claim.

What I claim is:

The process of treating rubber gum to change its physical condition, which consists in mixing gum with a light solvent to present a stiff solution, submitting the plastic mass in confinement to the effect of a rarefied atmosphere to render it cellular and spongy; admitting a vulcanizing agent thereto to infiltrate the mass, and thereafter passing a neutralizing agent for the vulcanizing agent through the spongy mass.

In testimony whereof I hereunto set my hand in the presence of two witnesses.

GRAY STAUNTON.

In the presence of—
FORÉE A. BAIN,
MARY F. ALLEN.